March 22, 1966 L. J. MOWRY ETAL 3,242,307
METHOD FOR WELDING STUDS
Filed Jan. 29, 1963 3 Sheets-Sheet 1
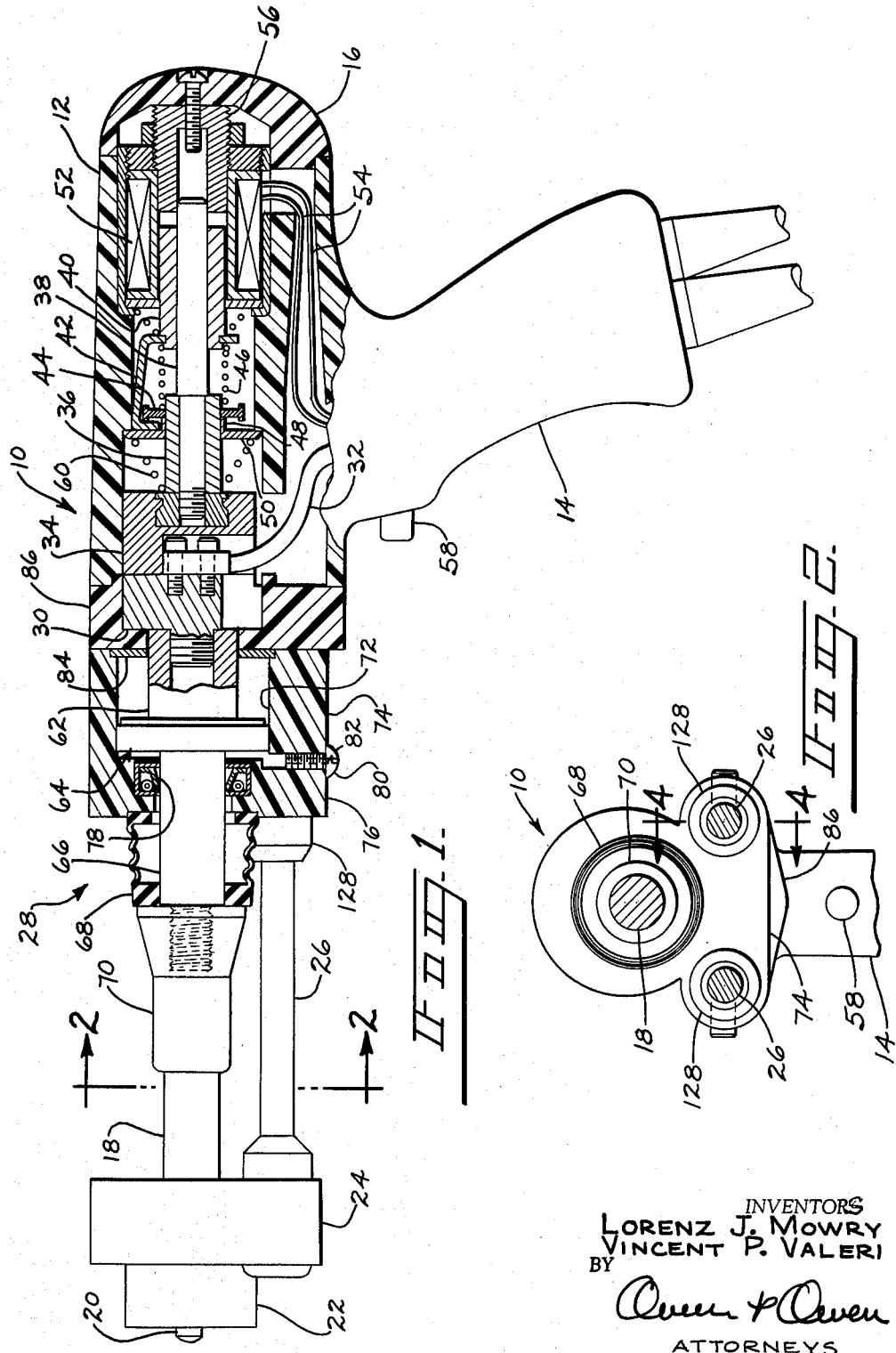
INVENTORS
LORENZ J. MOWRY
VINCENT P. VALERI
BY
*Owen & Owen*
ATTORNEYS March 22, 1966  L. J. MOWRY ETAL  3,242,307
METHOD FOR WELDING STUDS
Filed Jan. 29, 1963  3 Sheets-Sheet 2
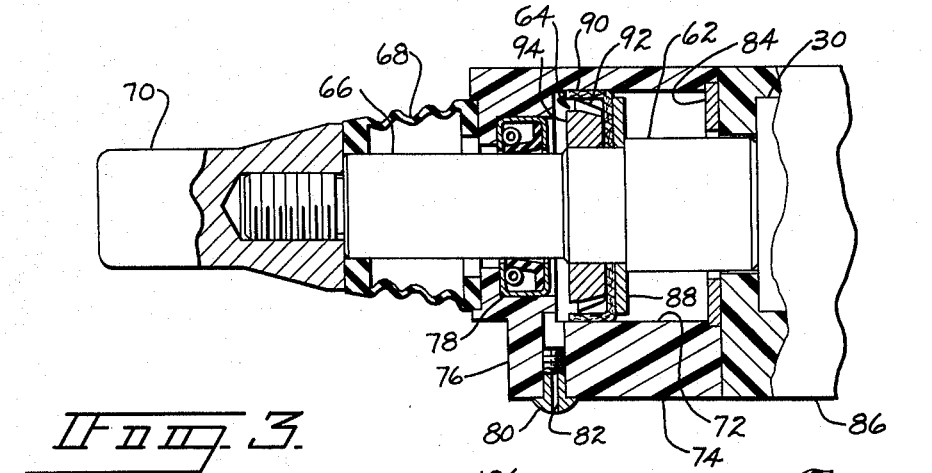
Fig. 3.
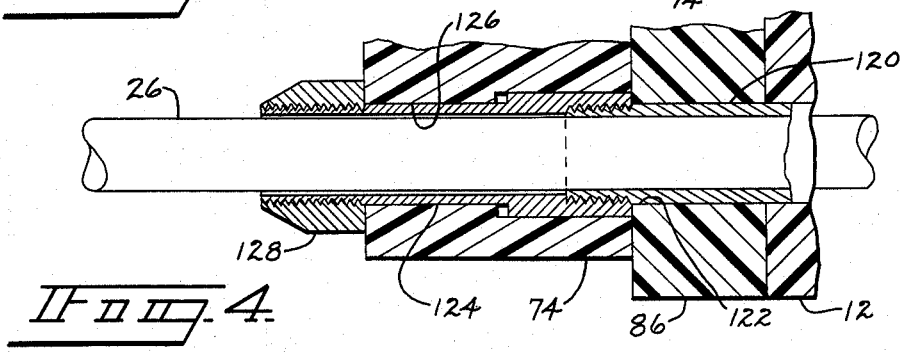
Fig. 4.
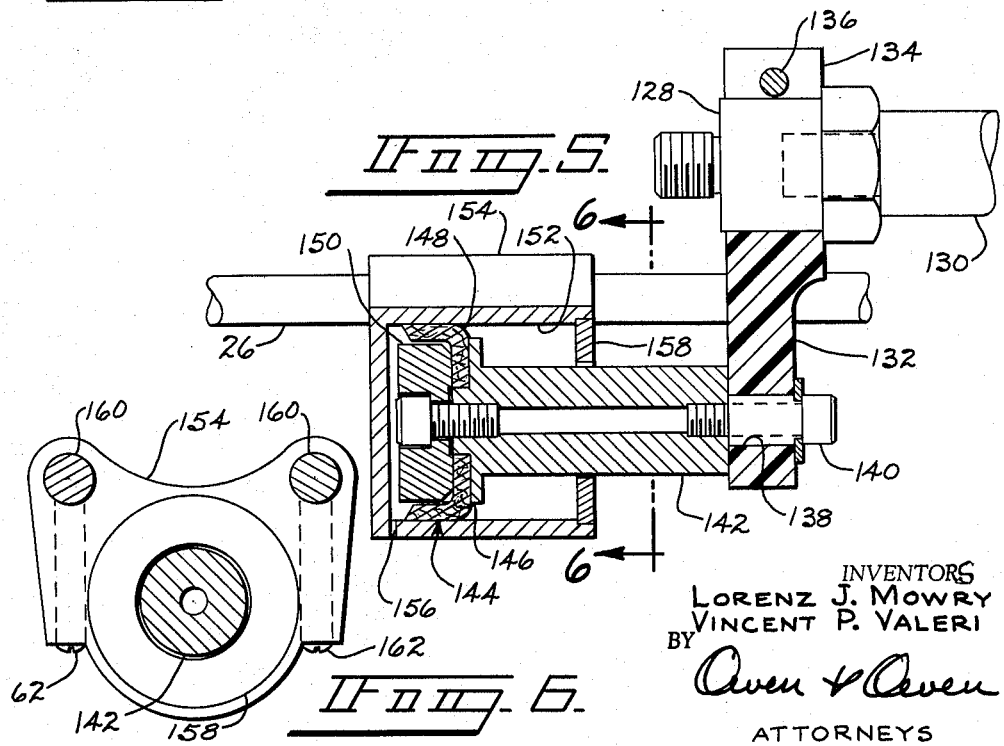
Fig. 5.
Fig. 6.
INVENTORS
LORENZ J. MOWRY
VINCENT P. VALERI
BY
Owen & Owen
ATTORNEYS

INVENTORS
LORENZ J. MOWRY
VINCENT P. VALERI
BY

*Owen & Owen*

ATTORNEYS

United States Patent Office 3,242,307
Patented Mar. 22, 1966

3,242,307
METHOD FOR WELDING STUDS
Lorenz J. Mowry, Elyria, and Vincent P. Valeri, Amherst, Ohio, assignors to Gregory Industries, Inc., Lorain, Ohio, a corporation of Michigan
Filed Jan. 29, 1963, Ser. No. 254,786
4 Claims. (Cl. 219—99)

This invention relates to a method and apparatus for welding a stud to a surface of a metal work piece and more particularly to a new method and apparatus for controlling movement of the stud toward the surface during a plunge stroke of the welding operation.

Portable stud welding tools are now well known in the art and are finding wider acceptance for more and more applications. Such tools are capable of welding a wide variety of studs to the surfaces of a wide variety of work pieces in a rapid and efficient manner. These welding tools assure that all of the studs are welded securely and uniformly and that they are truly perpendicular to the surface of the work piece. One difficulty with welding tools heretofore known is the splattering or splashing of the molten metal which results when the stud is plunged against the surface of the work piece a predetermined period of time after an arc is struck therebetween. The stud is moved into contact with the surface under a relatively high force and high velocity to secure the weld with the result that some of the molten meal is squeezed from between the stud and the surface and may be thrown several feet in all directions. This molten metal, of course, is hazardous, and disconcerting to the operator. Further, the molten metal tends to mar the surface of the work piece, the stud shank, and surrounding objects, particularly if solidified beads of the metal stick thereto. In particular, however, the splattering metal makes it difficult accurately and uniformly to control the fillet of the weld metal formed between the stud and the surface of the work piece. The fillet is important to both the strength and appearance of the weld.

The present invention provides a method and apparatus for welding studs whereby a stud, after being lifted or retracted and an arc struck between it and the work piece, is first moved rapidly toward the work piece and subsequently moved at a much slower rate as the molten end of the stud contacts the pool of metal on the work piece, to overcome the above difficulty. The splatter of molten metal is reduced substantially by this type of plunging stroke, resulting in better fillet control, safer and less annoying operating conditions, and less marring of the work surface, stud, and other objects. Further, by moving the stud rapidly during the first portion of the stroke and at a much slower rate after the molten metal of the stud contacts the molten metal of the work piece, better conrol over weld time and more consistent weld time is possible than if the stud is moved slowly throughout the entire length of the plunge stroke in an attempt to reduce splattering. The two speed stroke also virtually assures a hot plunge with the metal continuing to remain molten whereas with a single speed slow stroke, it is possible for the arc to be shut off and the molten metal to cool before contact between the stud and the work piece can be made. Further, the end of the two speed stroke can be much slower than is practical when the entire plunge stroke is at a constant, slow rate. Even so, the overall plunge stroke requires little if any more time than a plunge stroke of uniform, slow velocity throughout its length.

It is, therefore, a principal object of the invention to provide an improved method and apparatus for welding studs to work pieces resulting in less metal splatter.

Another object of the invention is to provide a method and apparatus for welding studs to a work piece with better control over welding time and over the density and configuration of the weld fillets.

Still another object of the invention is to provide a method and apparatus for performing a welding operation with a two-speed plunge stroke, having a fast initial portion and a slower end portion.

Many other objects and advantages of the invention will be apparent from the following detailed description of a preferred embodiment thereof, reference being made to the accompanying drawings, in which:

FIG. 1 is a view in elevation, with parts broken away and with parts in cross section, of a stud welding tool incorporating a plunge control device according to the invention;

FIG. 2 is a section on line 2—2 of FIG. 1;

FIG. 3 is an enlarged view in vertical, longitudinal cross section of the plunge control device of FIG. 1;

FIG. 4 is a fragmentary view in cross section showing means for attaching the housing portions of the plunge control device to the main tool body and for receiving the supporting legs of the tool;

FIG. 5 is a fragmentary view in cross section of a welding tool with a slightly modified plunge control device embodying the invention;

FIG. 6 is a view of part of the device of FIG. 5 taken along the line 6—6 of FIG. 5;

Figure 7:
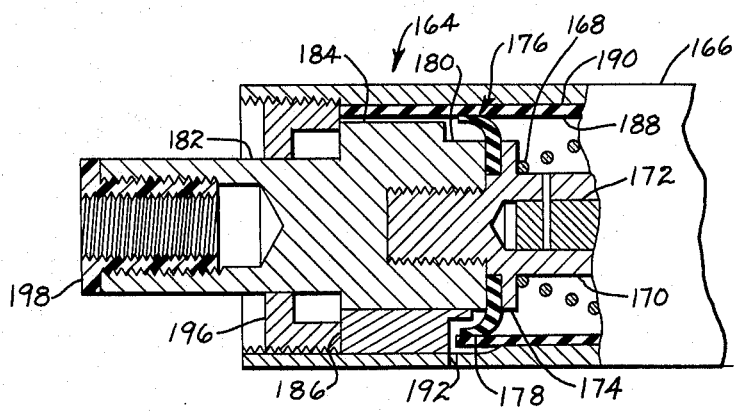
FIG. 7 is a fragmentary view in longitudinal cross section of a welding tool with a still further modified plunge control device according to the invention.

The term "stud" as used here and in the appended claims is intended to broadly cover a body capable of being welded to a surface of a work piece by means of an electric welding tool and is not limited to any particular size or shape. The stud can be hollow or solid, circular or non-circular in transverse cross section, threaded or plain, straight or curved, and elongate or squat.

Referring to the drawings, and more particularly to FIG. 1, a welding tool incorporating the invention is indicated at 10 and can be of any known type, as long as it has means for retracting a stud from a surface of a work piece, means for holding the stud in the retracted position for a predetermined period of time, and means for moving the stud toward and against the work piece after the elapse of the predetermined period of time. The welding tool 10 includes a main body or housing 12 of suitable dielectric material and includes an integral pistol grip 14 and a separate end cap 16.

Held in front of the tool body 12 is a chuck 18 which removably receives a stud 20. The stud 20 is surrounded by but projects slightly beyond a spark shield 22 attached to a welding foot 24 which is adjustably supported by two legs 26, as is well known in the art. In place of the spark shield 22, a ceramic ferrule can be used with each of the studs 20, as is also well known.

The chuck 18 is retracted and plunged forwardly by conventional mechanism within the tool body 12 to which the chuck 18 is connected by a connecting means associated with the invention and which will be discussed subsequently. The connecting means, generally indicated at 28, is attached to the chuck 18 at the forward end and is threadedly engaged with a cable clamp 30 at the rear end, which clamp is of conventional design. The clamp 30 is electrically connected to a main welding conductor or lead 32 which supplies welding current to the clamp 30 and through the connecting means 28 to the chuck 18 and the stud 20.

A rear cable clamp part 34 is screwed to the cable clamp 30 and moves therewith. The cable clamp part 34 is suitably connected to a lift rod 36 which has a guide rod 38 extending rearwardly through a movable core 40. The movable core 40 is attached to a lifting hook 42 which is capable of engaging a lifting ring 44 when the core 40 is moved rearwardly. The ring 44 is maintained in a perpendicular position by a lifting ring spring 46 which urges the ring 44 against a shoulder 48 of a front bearing 50 and in this position enables the lifting rod 36 to move freely therethrough. However, when the lifting hook 42 engages the lifting ring 44, the ring moves to a canted position in which it engages the lifting rod 36 so that further rearward movement of the hook causes a retracting movement of the rod 36, the chuck 18 and the stud 20.

The movable core 40 is retracted when current is supplied to a lifting and holding coil 52 through suitable leads 54. The rearward movement of the core 40, which determines the extent of lift of the stud 20, is limited by an adjustable core piece 56. Power for the welding current conductor 32 and the coil leads 54 is controlled by a suitable trigger 58. A main spring 60, which constitutes a means for moving the chuck 18 and the stud 20 in a direction away from the tool body 12 and toward the work piece, urges the stud 20 toward the work piece and moves the stud in a plunging stroke toward the work piece when the coil 52 is deactivated.

In the operation of the conventional welding tool described so far, the stud 20 is positioned above the point on a surface of a work piece to which it is to be welded and is then pressed against the surface until it is flush with the annular edge of the spark shield 22. This assures that the stud 20 will initially be in good electrical contact with the work piece. When so pressed, the chuck 18, the connecting means 28, the cable clamp 30, the cable clamp part 34, the lifting rod 36 and the guide rod 38 all move rearwardly a corresponding amount. When the trigger 58 is then actuated, current is supplied through the welding conductor 32 to the stud 20 and at the same time to the coil 52. This causes the movable core 40 to move into the coil 52 until it abuts the adjustable core 56. This movement of the core 40 causes the lifting hook 42 to engage the lifting ring 44 which thereby engages the lifting rod 36 to move the stud 20 away from the surface of the work piece a distance substantially equal to the distance which the core 40 moves into the coil 52. As the stud 20 moves away from the work surface an arc is struck therebewteen due to the potential maintained across the stud and the work piece. The arc persists between the stud and the work piece as the stud 20 is held in the rear position for a predetermined period of time, which is determined by a timer in the welding circuit as described, for example, in the United States patent to Nelson, No. 2,413,189. When the timer times out, the current to the coil 54 is shut off and the stud is plunged against the work piece by the spring 60. The welding current is shut off by the timer a short period of time after the current to the coil 52 is shut off, to extinguish the arc. The delay in shutting off the welding current actually is due to a design delay in the contactor or other control components of the circuit, as is known.

During the period of persistance of the arc between the stud 20 and the work piece, a molten pool of metal is formed both on the tip of the stud and on the surface of the work piece. When the current to the coil 52 is terminated and the spring 60 plunges the stud 20 against the work piece, an undesirable splatter or splashing of the molten metal occurs, with this molten metal being thrown out through vents in the spark shield or the ceramic ferrule. This is disconcerting and dangerous to the operator. It can also constitute a fire hazard if combustible material should be laying nearby. The molten metal beads or berries sometimes mar the surface of the work piece, especially if they adhere to it. Of particular importance is the fact that the splattering of the metal reduces control over the density and configuration of the fillet of weld metal established between the end of the stud and the work piece, the fillet affecting the strength and appearance of the weld.

The present invention provides a method and apparatus associated with the connecting means 28 by which the plunger stroke of the stud 20 is slowed down substantially toward the end of the stroke and preferably from approximately the point of contact between the molten metal on the stud and the molten metal on the work piece. The slow movement of the stud greatly reduces the uncontrolled loss of metal by splatter, which results in improved fillet control, safer and less annoying operation, and less marring of the work piece.

In accordance with the invention, the movement of the stud is substantially unimpeded during the first part of the plunge stroke so that speed of approach during the first part of the stroke is quite similar to the rate of speed of the stud throughout the plunge stroke of a conventional welding tool. By moving the stud rapidly during the first part of the plunge stroke, the weld time, that period in which the arc exists between the work piece and the stud, can be much more accurately controlled than if the stud is moved slowly throughout the plunge stroke. The rapid initial movement of the stud also tends to assure that a hot plunge will occur, with molten metal still existing on the stud and on the work piece at the time of their contact. On the other hand, if a slow plunge stroke were employed, the operation would be subject to the possibility that the welding current might shut off too soon and that the two pools of molten metal would solidify excessively before contact between them could be made. The time required for the two-speed plunge stroke also is substantially shorter than if very slow speed were employed throughout the length of the stroke.

Referring to FIGS. 1 and 2, the connecting means 28 is associated with a plunge stroke control device according to the invention for achieving the above advantages. For this purpose, the connecting means includes a rear piston rod 62 threadedly engaged with the conductor clamp 30, a plunge control piston 64, and a forward piston rod 66. The piston rod 66 extends through a conventional bellows 68 and is attached to a plunge control adapter 70 which, in turn, is connected to the chuck 18. The piston 64 is located in a plunge control cylinder 72 formed by a cylinder housing 74 which has a closed end wall 76 through which the forward piston rod 66 extends in fluid-tight relationship by means of a seal 78. An orifice passage 80 is formed in the cylinder housing 74 by a metal insert 82 which can be replaced to vary the size and discharge capacity of the passage 80. The rear piston rod 62 extends through a washer 84 and into a rear end wall housing 86 which is substituted for the usual front cap normally attached to the tool body 12. The rear piston rod 62 is loosely associated with the housing 86 so that air or other compressible fluid can move freely into and out of the rear portion of the cylinder 72 from the confines of the tool body 12, as the piston 64 is reciprocated within the cylinder 72.

The piston 64, as shown more particularly in FIG. 3, is provided with peripheral packing which enables compressible fluid in the cylinder 72 to move from the portion of the cylinder behind the piston to the portion in front as the piston is retracted during the lift stroke or cycle of the welding operation, but which prevents a reverse flow of air. The piston packing includes a piston cup support 88, a flexible piston cup 90, a piston cup expander 92, and a piston cup support washer 94 which is pressed onto the piston rod. Compressible fluid in the rear portion of the cylinder 72 easily forces the piston cup 90 away from the cylinder wall to enable the fluid to pass by the piston 64. On the other hand, compressible fluid portion in the front portion of the cylinder 72, when acting upon the piston cup 90, forces the cup periphery against the cylinder wall to provide an effective seal and to prevent escape of compressible fluid in the opposite direction past the piston.

With the plunge control device, when the movable core 40 is retracted into the coil 52 when the trigger 58 is pressed, the piston 64 will move rearwardly in the cylinder 72 substantially unimpeded. The compressible fluid in the rear portion of the cylinder 72 moves easily past the piston 64 into the front portion and also past the end wall housing 86 into the interior of the tool body 12. Hence, the lift cycle or stroke of the welding operation of the tool 10 is substantially unaffected by the addition of the plunge control device to the tool. However, when the timer has shut off the current to the coil 52, and the main plunger spring 60 initiates the plunge stroke, the piston 64 moves forwardly in the cylinder 72 as the stud 20 moves toward the work piece. The compressible fluid in the front of the cylinder 72 is initially at atmospheric pressure, having flowed past the piston 64 during the lift stroke and also having been drawn through the orifice 80. During the forward stroke, this fluid cannot flow in the opposite direction past the piston cup 90 and, hence, is trapped and compressed in the front portion of the cylinder 72, except for a controlled volume which escapes through the orifice 80. This volume is relatively small compared to the volume being compressed by the rapid forward movement of the piston 64. The air or other compressible fluid in the forward portion of the cylinder 72 is relatively easily compressed at first so that it has little impeding action on the piston 64 and the initial part of the plunge stroke is substantially as fast as in a conventional welding tool. However, as the pressure of the compressible fluid rises, it reacts against the forward movement of the piston 64 and decelerates such forward movement relatively rapidly, with the last part of the movement of the piston 64 and the stud 20 being at a much slower rate of speed than the first part of the stroke. The speed of the last part of the plunge stroke is determined primarily by the size of the orifice 80, which determines the rate of escape of the compressed fluid from the cylinder.

Preferably, the plunge stroke is controlled so that the first uninhibited part in which the movement of the stud 20 is substantially unaffected by the plunge control device continues until the molten metal on the end of the stud approximately is in contact with the molten metal on the work piece. At this time the pressure of the compressible fluid will have risen to the point that the resistance to the forward movement of the piston becomes significant, whereby the remaining part of the plunge stroke is at a substantially slower speed than the initial part, until the stud comes to rest against the work piece at the completion of the plunge stroke. It is also preferred that the arc is maintained between the stud and the work piece until the two molten pools come into contact. This assures that the metal will remain molten and not solidify excessively before contact. The rate of speed of the second or remaining part of the plunge stroke is from 3% to 75% the rate of speed of the initial or first part of the plunge stroke and preferably is from 5% to 50% of the rate of speed of the first part of the plunge stroke. If the speed of the remaining part of the plunge stroke is less than approximately 3% the speed of the initial part, it will be too slow to be practical and if more than 75%, the reduction in splatter is insignificant. The ultimate value within the range will depend on the stud and work piece material, the stud diameter, the thickness of the work piece and the condition of the stud and work piece. The percentage for aluminum studs, for example, will usually be much higher than the percentage for steel studs. While the point of contact of the molten metal pools will vary for different applications and for different types of materials, the initial part of the plunge stroke in which the rate of speed is substantially uninhibited will constitute from approximately two-fifths to approximately four-fifths of the overall length of the plunge stroke. At the same time, the remaining part of the plunge stroke in which the rate of speed is substantially inhibited will constitute from approximately one-tenth to approximately three-fifths of the overall length of the plunge stroke.

A specific, measured, example of the operation of the plunge stroke control device will be set forth below for purposes of illustration and not limitation. In this instance, the main spring 20 has a compressive force of 20 pounds, the cylinder 72 has a diameter of 1⅞ inches, and the forward piston rod or extension 66 has a diameter of 1 inch. The diameter of the orifice 80 is 0.022 inch. The length of the lift stroke is 0.088 inch and the overall length of the plunge stroke is 0.298 inch. This means that the original length of the stud 20 is shortened by 0.210 inch when welded to the work piece.

Figure 9:
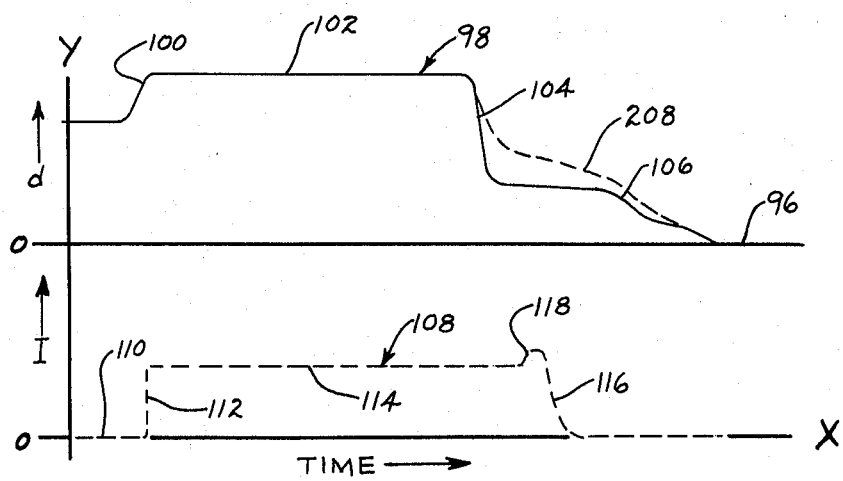
FIG. 9 is a graph illustrating stud movement and current magnitude in a welding operation when the plunge control device of the invention is employed.

The position of a point on the stud 20 in relation to the work piece is illustrated in FIG. 9. In this instance, the X axis represents time as measured in milliseconds and the Y axis represents the distance $d$ of the stud above the work piece in inches. A curve 98 represents the position of a point on the stud 20 relative to the work piece, which point in this instance is 0.210 inch from the lower or outer end of the stud 20. Before the welding operation is commenced, the point on the stud is 0.210 inch from the work piece with the end of the stud in contact with the work piece. When the trigger is moved and the coil 52 retracts the stud, the lift stroke of 0.088 inch represented by an offset 100 in the curve 98, with a subsequent long flat segment 102 representing the period in which the stud is held away from the work piece and the arc persists between them. After the holding period, the plunge stroke is initiated with the stud being substantially uninhibited during a first part represented by a sharply sloping segment 104 of the curve 98 which preferably continues until the molten metal on the stud 20 contacts the molten metal on the work piece. By this time, the pressure of the compressible fluid in the forward end of the cylinder 72 has risen to the point that its resistance to the piston 64 becomes significant and the speed of the stud 20 is abruptly reduced. The abruptness of the change in speed apparently is due, at least in part, to the resiliency of the compressible fluid which reacts against the piston. In addition, the force of the spring and the momentum of the piston both act downwardly and the latter is substantially reduced as the piston slows down. Hence, after contact of the two pools of molten metal, a remaining part of the plunge stroke represented by a segment 106 of the curve 98 is at a much slower speed until the stroke is completed. In this example, the average speed of the remaining part of the plunge stroke is approximately 0.0005 inch per millisecond, whereas the speed of the initial part of the stroke is approximately 0.007 inch per millisecond. The initial, fast part of the plunge stroke in this instance constitutes about two-thirds of the stroke length while the remaining, slower part of the plunge stroke constitutes about one-third of the stroke length. The remaining, slower part of the plunge stroke is not at a uniform speed in this instance but the initial portion actually is slower than the latter portion. Whether or not the speed is constant for either part of the plunge stroke is not important, however, as small variations will usually occur and are immaterial. Where reference is made to the speed of one part of the stroke, here and in the claims, average speed is meant. The degree or abruptness of the change from the fast part of the plunge stroke to the slower part of the plunge stroke will depend upon a number of factors, such as the type of compressible fluid used, the volume of the forward portion of the cylinder 72, the size and location of the orifice 80, and the strength of the main spring 60. In some instances, the change from the initial part of the plunge stroke to the remaining part may be more gradual so that a portion of the plunge stroke between the initial part and the remaining part cannot accurately be called either the initial or the remaining part. The important thing is, of course that the end part of the plunge stroke, particularly after the two pools of molten metal contact one another, by much slower than the initial part, and, as pointed out above, preferably from 5% to 50% as fast as the initial part.

The weld current in the above example is represented by a curve 108 in FIG. 9, with the Y axis in this instance representing the current I in amperes. The initial current is zero as represented by a flat segment 110 of the curve, with the current applied as the stud is lifted. The current then rises to a predetermined level, the rise being represented by an offset portion 112 of the curve 108. The current remains at the high level, represented by a flat segment 114, while the stud is in the retracted position. When the holding coil 52 is deactivated, the welding current is shut off after a slight delay so that the current remains on during the initial part of the plunge stroke, being cut off approximately at the time the two molten pools of metal contact one another, as represented by a declining segment 116 of the curve 108. If the welding current is not cut off in the welding circuit, as is often the case, until after the two molten pools contact one another, a surge of current occurs as the dead short condition is reached, as represented by a hump 118 of the curve 108. Preferably, as pointed out above, the arc between the work piece and stud persists during the initial part of the plunge stroke to establish a hot plunge and to assure that molten metal will exist at the time of contact.

The end wall housing 86 is intended to replace the usual end cap which is normally attached to the housing 12 by a pair of hollow threaded stud fasteners 120 molded into the tool body 12 and extending therefrom. The end wall housing 86 has a pair of openings 122 therein to receive the stud fasteners 120 with the threaded ends of the fasteners 120 extending beyond the end wall housing 86. In addition, a pair of tubular extensions 124 have female threaded ends engaged with the stud fasteners 120 and male threaded ends extending beyond openings 126 in the cylinder housing 74. Cover nuts 128 are threaded on the outer ends of the tubular extensions 124 thereby to fasten the cylinder housing 74 against the end wall housing 86 and to fasten the end wall housing 86 against the tool body 12. The tubular extensions 124 have internal diameters of sufficient size to receive the supporting legs 26 of the tool. The legs 26 of the tool 10 preferably are longer than the ones used with the basic tool to accommodate the additional length resulting from the piston construction.

With the embodiment shown in FIGS. 1–4, the attachment consisting of the cylinder housing 74 and the end wall housing 86 must be designed to fit each particular tool. When it is desired to provide a universal attachment capable of fitting most welding tools, the embodiment shown in FIGS. 5 and 6 is preferred. In this instance, a connecting member 128 is fastened to a plunge rod 130 which connects the member 128 with the cable clamp 30 or a similar component which, in turn, in connected to a suitable coil core or other mechanism for lifting the rod 130 and the connecting member 128. The other end of the connecting member 128 can be threadedly engaged with either the adaptor 70 or directly with the chuck 18. A transverse extension 132 has bifurcated legs 134 extending around the connecting member 128 and clamped thereto by a bolt 136. The lower end of the extension 132, which extends between the welding tool supporting legs 26, has an opening 138 therein which receives a bolt 140 for connecting a piston rod 142 to the extension 132. The piston rod 142 is fastened to a piston indicated at 144 which includes a supporting flange 146, a piston cup 148, and a supporting washer 150. The piston 144 is received in a cylinder 152 formed by a cylinder housing 154. The housing 154 has an orifice 156 which can also include and orifice insert similar to the insert 80 of FIG. 3 for enabling the controlled escape of compressed compressible fluid from the cylinder 152 between the closed end and the piston 144. An end wall washer 158 is attached to the opposite end of the cylinder 152 for receiving the piston rod 142.

The piston 144 and the cylinder 152 function in the same manner as the corresponding piston and cylinder of the embodiment of FIGS. 1–4. When the chuck attached to the connecting member 128 is moved away from the tool body and toward the work piece, the piston 144 moves toward the closed end of the cylinder 152 and compresses compressible fluid between the closed end of the cylinder and the piston. This fluid originally has little resistance but as its pressure rises the resistance also rises to impart a relatively sudden retarding movement to the piston 144 which is communicated through the piston rod 142 and the extension 132 to the connecting member 128 and, hence, to the chuck and the moving means of the tool. The plunge stroke of the tool then is divided into two portions of different speeds similar to the curve shown in FIG. 9. When the chuck is lifted, the piston 144 moves toward the rear of the cylinder 152 with compressible fluid therein flowing by the piston cup 148 in the same manner as before to have substantially no effect upon the lifting stroke.

While the operation of the piston and cylinder are substantially the same as before, the overall attachment differs substantially from that of FIGS. 1–4 in that the connecting member 128 and the cylinder housing 154 can be used with many different styles and types of welding tools. For this purpose, the cylinder housing 154 has two spaced openings 160 therein to receive the supporting legs 26 of the tool. The housing 154, when properly longitudinally adjusted on legs 26 is then affixed thereto by set screws 162 extending through a portion of the housing and engaging the legs to hold the housing in a fixed position during operation of the tool.

The embodiment of FIG. 7 is basically similar to the previous two embodiments, functioning in the same manner. With the embodiment of FIG. 7, however, a plunge stroke control device 164 is formed integrally with a tool body or housing 166. The overall tool of FIG. 7 also varies in that an external connection is used for the welding conductor (not shown) so that the conductor clamp 30 and the conductor part 34 of FIG. 1 can be eliminated. This means that a main spring 168, corresponding to the main spring 60, can be located immediately behind the control device 164. A rear piston rod 170 is suitably connected to a lifting rod, a portion of which is indicated at 172, and has a piston support flange 174 against which the main spring 168 acts. A piston 176 associated with the piston rod 170 includes, beside the piston flange 174, a piston cup 178 and a shoulder member 180 formed on part of a front piston rod 182 which is threadedly engaged with the rear piston rod 170. In front of the shoulder member 180 of the piston rod 182 is a non-circular guide portion 184 which has a flat portion cooperating with an inwardly extending member 186 to maintain the piston in non-rotatable relationship. The piston 176 slides in a cylinder 188 behind the member 186, which cylinder is formed by a sleeve 190 in the tool body 166. An orifice 192 is located at the forward, closed end of the cylinder 188 to enable a controlled escape of compressible fluid as before. The rear end of the cylinder 188 is in communication with the interior of the tool body with compressible fluid flowing past the piston 176 when it is retracted and with some air being drawn thereinto through the orifice 192. When the cylinder is moved forwardly during a plunge stroke, it traps compressible fluid in the closed end of the cylinder 188 which serves to suddenly retard the forward movement of the piston 176, as discussed in connection with the plunge control device of FIGS. 3 and 5. A retainer ring 196 is located in the front of the body 166 and an insulating bushing 198 is located in the front of the piston rod 182. A suitable external cable clamp is engaged with the bushing 198 to supply welding current to the chuck and the stud in the usual manner while insulating the piston rod 182 and the portions of the tool therebehind from the heavy welding current.

Figure 8:
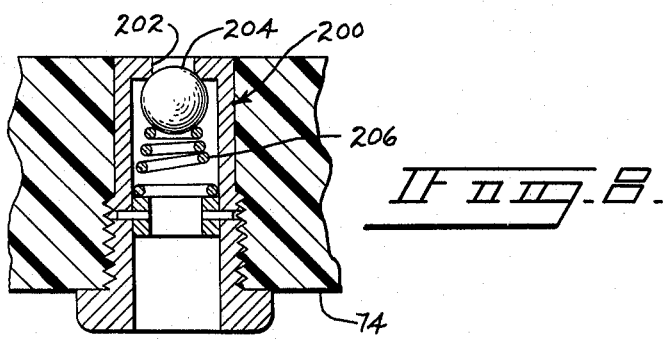
FIG. 8 is a fragmentary view in cross section of a plunge control device employing a modified control orifice.

A ball check insert 200 shown in FIG. 8 can be used in place of the metal insert 82 forming the open, unrestricted orifice 80 in the closed end of the plunge control cylinder 72 of FIGS. 1 and 3. The ball check insert 200 includes an orifice 202 which is blocked by a ball 204 pressed thereagainst by a spring 206. The insert 200 can be replaced by one of a different size or with a different spring 206 to change the overall performance and shape of the plunge stroke.

In this instance, the compressible fluid rises in the closed end of the cylinder slightly more rapidly than with an unrestricted orifice so that the slower part of the plunger stroke occurs earlier than with the orifice previously described. Once the pressure rises sufficiently to overcome the force of the spring 206, the fluid escapes more rapidly so that the duration of the slow part of the stroke is somewhat smoother than that obtained with a constantly open orifice. In some instances, the piston may actually bounce back slightly during the initial portion of the slow part of the stroke. This can be eliminated entirely by use of a ball check insert. The slow part of the plunge stroke when the ball check insert 200 is employed is represented by a dotted line 208 in FIG. 9.

While the two-stroke movement as disclosed above is accomplished with a cylinder-piston arrangement using a compressible fluid, other means can be employed. For example, mechanical means with a friction brake applied part way through the stroke can be used. Also, a piston and a hydraulic cylinder with two by-pass lines, one of which is shut off part way through the stroke, can be used. A clutch connected to an impeding mechanism can also engage the stud chuck itself, or a component attached to and moving therewith, part way through the plunge stroke. Electrical stroke control means can also be used, such as a coil through which a chuck component extends, with current supplied to the coil part way through the plunge stroke to establish the desired resistance to movement.

Numerous modifications of the above described embodiments of the invention will be apparent to those skilled in the art, and it is to be understood that such modifications can be made without departing from the spirit and scope of the invention, if they are within the spirit and tenor of the accompanying claims.

What we claim is:

1. A method of welding a stud to a surface of a work piece, which method comprises holding an end of the stud against the surface, moving the stud a predetermined distance away from the surface, applying an electrical potential across the stud and the work piece to establish an arc between the stud and the work piece, holding the stud at the predetermined distance from the surface for a predetermined period of time while continuing to maintain the arc between the stud and the work piece, moving the stud toward the work piece at a first speed, subsequently moving the stud toward the work piece at a second and slower speed until the stud end engages the work piece and stops, and stopping the arc substantially at the time the stud begins moving at the second and slower speed.

2. A method of welding an end of a stud to a surface of a work piece, which method comprises holding the stud with the end to be welded at a predetermined distance from the work piece, establishing a pilot arc between the stud and the work piece, establishing a main welding arc between the stud and the work piece while holding the stud at the predetermined distance, moving the stud toward the work piece at a first speed, subsequently moving the stud toward the work piece at a second and slower speed until the stud engages the work piece and stops, maintaining the welding arc between the stud and the work piece during the entire movement of the stud toward the work piece at the first speed, and stopping the arc substantially at the time the stud begins moving at the second and slower speed.

3. A method of welding an end of a stud to a surface of a work piece, which method comprises holding the stud with the end to be welded at a predetermined distance from the work piece, establishing a main welding arc between the stud and the work piece while holding the stud at the predetermined distance, moving the stud toward the work piece at a first speed for a distance equal to approximately two-fifths to four-fifths of the predetermined distance to the work piece, subsequently moving the stud toward the work piece at a second and slower speed for a distance equal to one-tenth to three-fifths of the predetermined distance, until the stud engages the work piece and stops, maintaining the welding arc between the stud and the work piece during the entire movement of the stud toward the work piece at the first speed, and stopping the arc substantially at the time the stud begins moving at the second and slower speed.

4. A method of welding an end of a stud to a surface of a work piece, which method comprises holding the stud with the end to be welded at a predetermined distance from the work piece, establishing a main welding arc between the stud and the work piece while holding the stud at the predetermined distance, moving the stud toward the work piece at a first speed for a distance equal to approximately two-fifths to four-fifths of the predetermined distance to the work piece, subsequently moving the stud toward the work piece at a second and slower speed from approximately three percent to approximately seventy-five percent of the first speed for a substantial portion of the remaining distance, maintaining the welding arc between the stud and the work piece during the entire movement of the stud toward the work piece at the first speed, and stopping the arc substantially at the time the stud begins moving at the second and slower speed.

References Cited by the Examiner

UNITED STATES PATENTS

| | | | |
|---|---|---|---|
| 2,217,964 | 10/1940 | Nelson | 219—98 |
| 2,462,882 | 3/1949 | Martin | 219—99 |
| 2,474,531 | 6/1949 | Keir et al. | 219—98 |
| 2,635,167 | 4/1953 | Nelson | 219—99 |
| 2,640,133 | 5/1953 | Ainsworth et al. | 219—98 |
| 2,712,049 | 6/1955 | Aversten | 219—98 |
| 2,755,365 | 7/1956 | Frank | 219—95 |
| 2,962,578 | 11/1960 | De La Rosa | 219—98 |
| 3,073,946 | 1/1963 | Hazel | 219—95 |
| 3,136,880 | 6/1964 | Glorioso | 219—98 |

FOREIGN PATENTS 511,783   4/1955   Canada.

RICHARD M. WOOD, *Primary Examiner.*